US007765054B2

(12) United States Patent
Jung et al.

(10) Patent No.: US 7,765,054 B2
(45) Date of Patent: Jul. 27, 2010

(54) INJECTOR CALIBRATION METHOD FOR OPERATING AN INTERNAL COMBUSTION ENGINE

(75) Inventors: Uwe Jung, Wörth a.d. Donau (DE); Janos Radeczky, Wenzenbach (DE); Michael Wirkowski, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/280,944

(22) PCT Filed: May 25, 2007

(86) PCT No.: PCT/EP2007/055103

§ 371 (c)(1),
(2), (4) Date: Dec. 17, 2008

(87) PCT Pub. No.: WO2007/144253

PCT Pub. Date: Dec. 21, 2007

(65) Prior Publication Data

US 2009/0177365 A1 Jul. 9, 2009

(30) Foreign Application Priority Data

Jun. 13, 2006 (DE) ....................... 10 2006 027 405

(51) Int. Cl.
*B60T 7/12* (2006.01)
*F02D 1/00* (2006.01)

(52) U.S. Cl. .................... 701/105; 701/103; 123/339.1; 123/406.23

(58) Field of Classification Search ................. 701/101, 701/103, 104, 105; 123/339.1, 339.16, 480, 123/406.23, 406.24
See application file for complete search history.

(56) References Cited

U.S. PATENT DOCUMENTS

| | | | | |
|---|---|---|---|---|
| 4,850,324 | A | 7/1989 | Furuyama | 123/479 |
| 5,111,788 | A * | 5/1992 | Washino | 123/339.11 |
| 5,703,410 | A * | 12/1997 | Maekawa | 290/40 C |
| 6,880,524 | B2 * | 4/2005 | Gates et al. | 123/399 |
| 2003/0192517 | A1 * | 10/2003 | Gates et al. | 123/568.16 |
| 2006/0047405 | A1 | 3/2006 | Bouchain et al. | 701/104 |
| 2006/0129302 | A1 | 6/2006 | Rueger et al. | 701/104 |
| 2007/0235006 | A1 * | 10/2007 | Nishigaki et al. | 123/339.1 |

FOREIGN PATENT DOCUMENTS

| | | |
|---|---|---|
| DE | 3819016 | 6/1988 |
| DE | 10012607 | 9/2001 |
| WO | 2004048763 | 6/2004 |
| WO | 2004053316 | 6/2004 |

* cited by examiner

*Primary Examiner*—John T Kwon
(74) *Attorney, Agent, or Firm*—King & Spalding L.L.P.

(57) ABSTRACT

A method for operating an internal combustion engine has the steps: (a) during an overrun phase of the internal combustion engine, activating an injector of a first combustion chamber for a predetermined activation time $\tau_{inj}$ with a predetermined activation voltage $U_{i=1}$, (b) measuring a torque variation, (c) determining, from the torque variation, a fuel quantity $m_{i=1}$ of the fuel injected by the injector during the activation time $\tau_{inj}$, (d) varying the activation voltage to a value $U_{i+1}$ which differs from $U_i$, (e) repeating steps (a) to (d) with further incrementation of i until i has reached a preset value N or the internal combustion engine is no longer in the overrun phase, and (f) determining an injector characteristic value of the injector of the first combustion chamber from the fuel quantities $m_1$, $m_2$, . . . , $m_N$ and the activation voltages $U_1$, $U_2$, . . . , $U_N$.

20 Claims, 4 Drawing Sheets

INJECTOR CALIBRATION METHOD FOR OPERATING AN INTERNAL COMBUSTION ENGINE

CROSS-REFERENCE TO RELATED APPLICATIONS

This application is a U.S. national stage application of International Application No. PCT/EP2007/055103 filed May 25, 2007, which designates the United States of America, and claims priority to German application number 10 2006 027 405.9 filed Jun. 13, 2006, the contents of which are hereby incorporated by reference in their entirety.

TECHNICAL FIELD

The invention relates to a method for operating an internal combustion engine, said engine having at least one combustion chamber and an injector for each combustion chamber for injecting fuel into the at least one combustion chamber and an engine management system, and a software program product.

BACKGROUND

A method is known for operating a diesel engine that comprises four cylinders and a piezo injector for each cylinder for injecting fuel into each of the four cylinders. A piezo injector is an injector in which the valve tappet is operated by a piezo actuator. During the known method, the torque of the diesel engine is first detected during an overrun phase of said engine. Then, the injectors are actuated with varying actuation times $\tau_{inj}$ and then the torque variation is used to determine how much fuel has been injected by each piezo injector.

In this way, the actuation time that is required for injecting a specified injection quantity into the combustion chamber is determined and, if necessary, an actuation time correction is determined.

Based on the actuation time correction determined in this way, the actuation time $\tau_{inj}$ for all injectors is altered such that the quantity of fuel specified by an engine management system is always injected. This method is only used for small injection quantities, as otherwise the running smoothness of the internal combustion engine suffers in the overrun phase and noises occur. This method reduces fuel consumption and the emission of pollutants.

The drawback of the known method is that this method makes high demands on the production accuracy of the piezo actuators. That is to say, if the piezo actuator exhibits too much elongation at a given actuation voltage, a shortest possible actuation time specified by the engine management system can result in too great an injection quantity. Therefore, narrow tolerances must be complied with for piezo actuators. In addition, ageing of the piezo actuators can also cause the quantity of fuel that is injected during the shortest possible actuation time to rise. Then, a small injection amount to be injected that is specified by the engine management system may be exceeded.

SUMMARY

According to an embodiment, a method for operating an internal combustion engine with at least a first combustion chamber and an injector for each combustion chamber for injecting fuel into the at least one combustion chamber, and that exhibits a torque during operation, may comprise the steps: (a) during an overrun phase of the internal combustion engine, actuating the injector of the first combustion chamber for a predetermined actuation time with a predetermined actuation voltage, then (b) detecting a torque variation of the torque of the internal combustion engine, (c) determining from the torque variation of the torque a quantity of fuel of the fuel injected by the injector during the actuation time, (d) after detecting a torque variation of the torque, varying the actuation voltage, (e) repeating the steps (a) to (d) with further incrementation of i, until i has reached a preset value N or the internal combustion engine is no longer in the overrun phase, and (f) determining an injector characteristic value of the injector of the first combustion chamber from the quantities of fuel and the actuation voltages.

According to another embodiment, an internal combustion engine may comprise at least one combustion chamber and an injector for each combustion chamber for injecting fuel into the at least one combustion chamber, and an engine management system operable (a) during an overrun phase of the internal combustion engine, to actuate the injector of the first combustion chamber for a predetermined actuation time with a predetermined actuation voltage, then (b) to detect a torque variation of the torque of the internal combustion engine, (c) to determine from the torque variation of the torque a quantity of fuel of the fuel injected by the injector during the actuation time, (d) after detecting a torque variation of the torque, to vary the actuation voltage, (e) to repeat (a) to (d) with further incrementation of i, until i has reached a preset value N or the internal combustion engine is no longer in the overrun phase, and (f) to determine an injector characteristic value of the injector of the first combustion chamber from the quantities of fuel and the actuation voltages.

According to a further embodiment, the injector characteristic value may describe the ageing of the injector. According to a further embodiment, the injector characteristic value may be the energy sensitivity of the injector. According to a further embodiment, the injector may exhibit an idle stroke and the injector characteristic value is the value of the idle stroke. According to a further embodiment, the method may comprise the additional step: once the preset value N has been reached, execution of the steps (a) to (f) for an injector for which the method has not yet been executed. According to a further embodiment, the internal combustion engine may have at least two combustion chambers each with at least one injector and the method is executed for all injectors so that injector characteristic values are obtained for all injectors. According to a further embodiment, the internal combustion engine may have an engine management system for actuating the injectors and the method comprises the step of adjusting an actuation variable for the individual injectors in the engine management system to the determined injector characteristic values. According to a further embodiment, the actuation variable for the individual injector may be the actuation voltage for the individual injector, which is adapted in such a way that all the injectors inject essentially the same quantities of fuel with the same actuation time. According to a further embodiment, the engine management system may have a shortest possible actuation time and the method may be executed if this shortest possible actuation time is not sufficient for injecting a predetermined injection quantity. According to a further embodiment, the method may comprise the step: issuing of a warning message if the injector characteristic value exceeds a preset threshold value.

BRIEF DESCRIPTION OF THE DRAWINGS

In the following, the invention is described in more detail with reference to the schematic drawings, in which.

DETAILED DESCRIPTION

Figure 1:
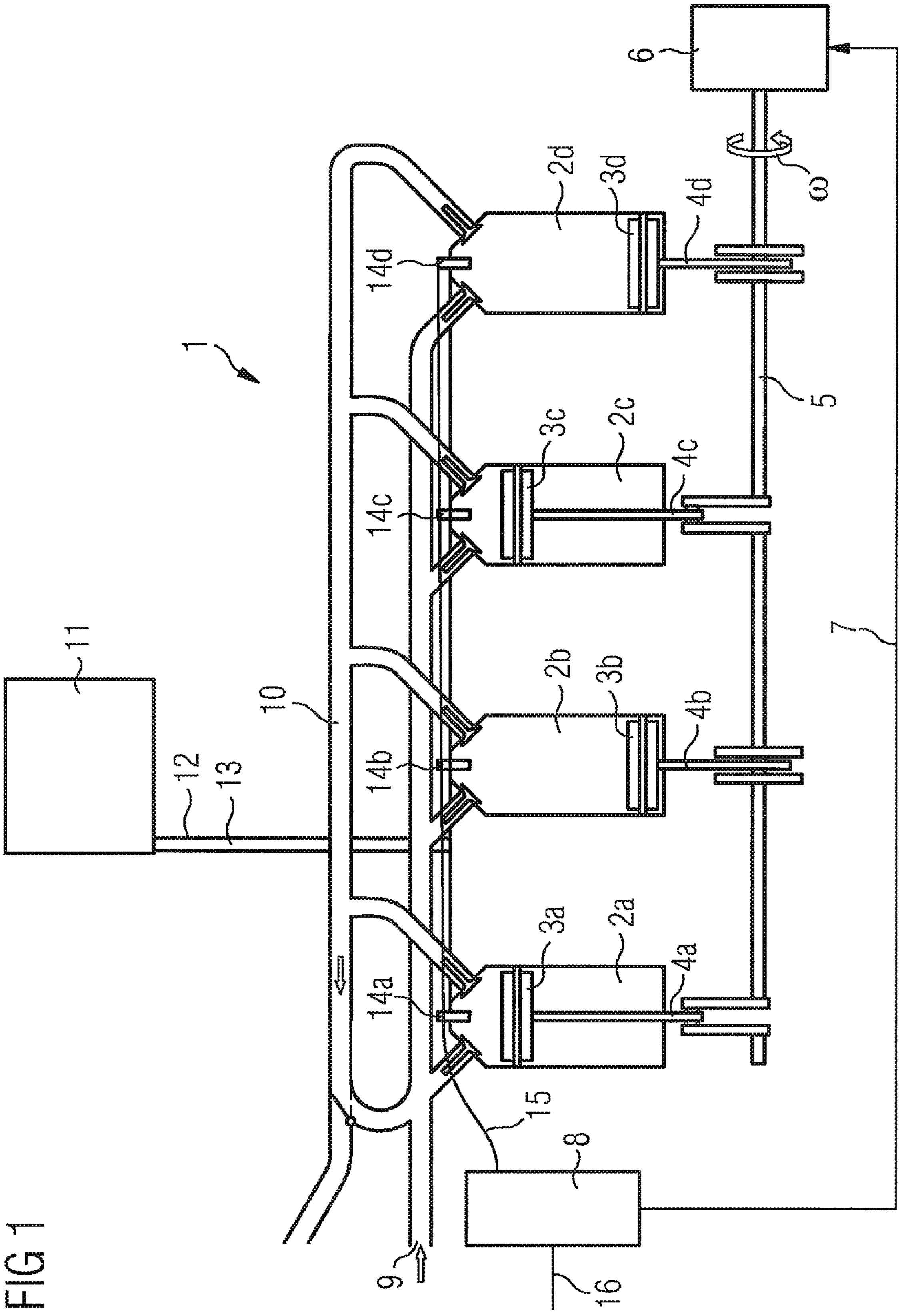
FIG. 1 shows a schematic representation of an internal combustion engine according to an embodiment.

According to a first aspect, a method for operating an internal combustion engine which comprises at least a first combustion chamber and an injector for each combustion chamber for injecting fuel into the at least one combustion chamber, and which exhibits a torque during operation, may have the steps: (a) in particular during an overrun phase of the internal combustion engine, actuating the injector of the first combustion chamber for a predetermined actuation time $\tau_{inj}$ with a predetermined actuation voltage $U_1$, then (b) determining a torque variation of the torque (M) of the internal combustion engine, (c) determining a fuel quantity $m_i$ of the fuel injected by the injector during the actuation time $\tau_{inj}$ from the torque variation of the torque, (d) following the detection of a torque variation of the torque, changing the actuation voltage to a value $U_{2=i+1}$ which differs from $U_i=U_1$, (e) repeating steps (a) to (d) with further incrementation of i until i has reached a preset value N or the internal combustion engine is no longer in the overrun phase and (f) determining an injector characteristic value of the injector of the first combustion chamber, in particular from the fuel quantities $m_1, m_2, \ldots, m_N$ and the actuation voltages $U_1, U_2, \ldots, U_N$.

According to a second aspect, an internal combustion engine may have an engine management system which is configured to execute such a method.

According to a third aspect, a software program product can be directly loaded into the internal memory of a digital engine management system and may comprise software code sections with which such a method can be executed when the software program product runs on the digital engine management system.

An advantage of such a method can be that the effects of ageing in the injectors are detected and can be corrected as necessary. This has the advantage that less strict tolerances are acceptable in the manufacture of the injectors, because any differences in the ageing of the injectors can be compensated for retrospectively. More favorably priced actuators can therefore be used.

A further advantage can be that the method according to various embodiments can be implemented with very little effort. The advantages can therefore be achievable at a reasonable cost. Moreover, it is easily possible to retrofit existing internal combustion engines.

A further advantage is that the emissions of pollutants from the internal combustion engine can also be kept low even in ageing injectors, which makes a contribution towards environmental protection.

As part of the present application, an internal combustion engine is understood to be in particular a piston engine, in particular a reciprocating piston engine, in particular a petrol or diesel engine. The internal combustion engine is preferably configured for use in a passenger vehicle or a goods vehicle. Preferably, internal combustion engines of this type have a maximum output of between 10 kW and 300 kW.

Figure 2:
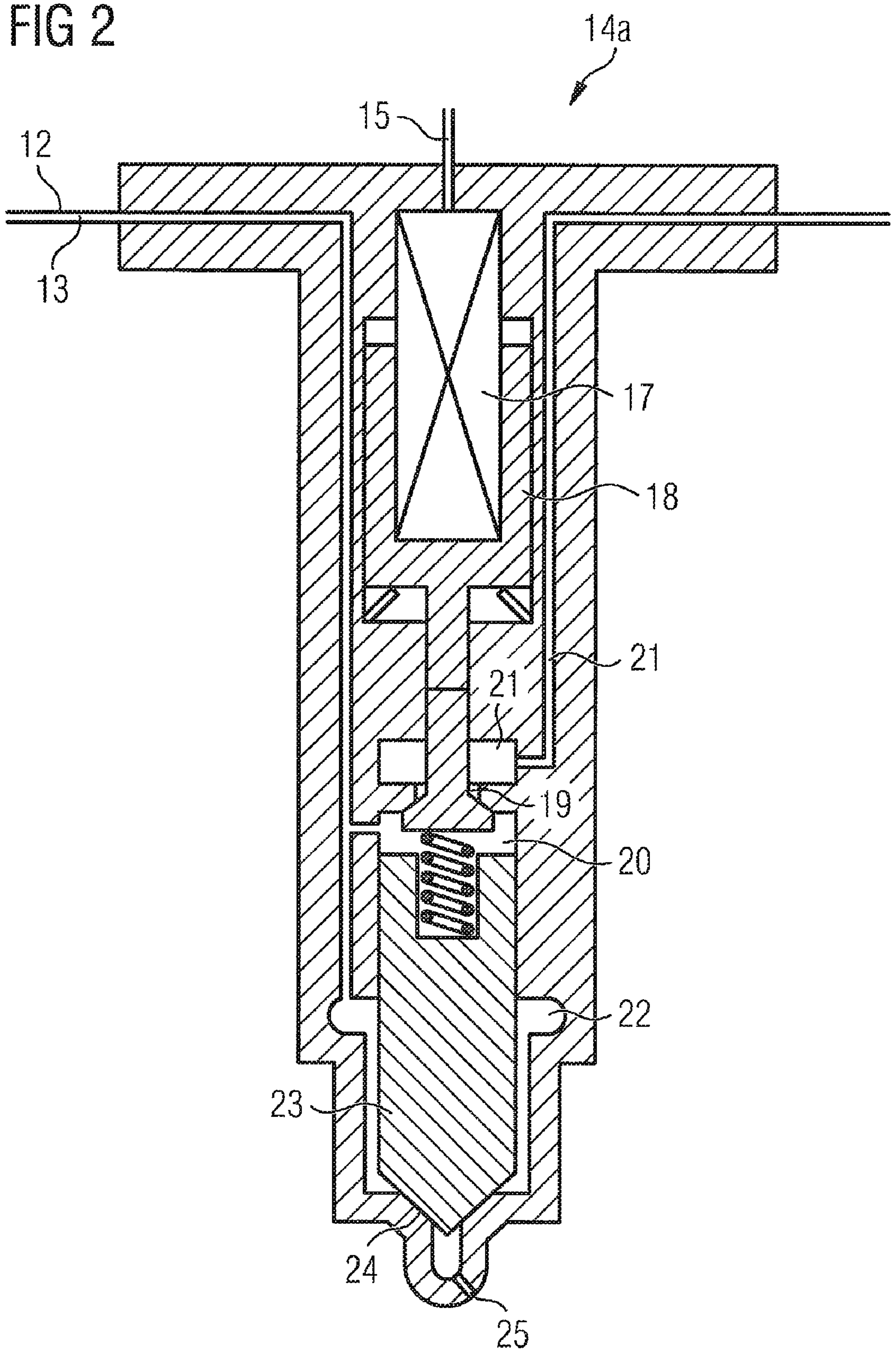
FIG. 2 shows a schematic representation of an injector of the internal combustion engine from FIG. 1.

A piezo injector is preferably used as an injector, which means that the injector comprises a piezo actuator that drives a valve tappet. In this case, the electrical injector characteristic values relate to the piezo actuator. Preferably, a servo piezo injector is present, as shown below in FIG. 2 as an example.

When mentioned in claim 1 that every combustion chamber comprises an injector for injecting fuel, it does not mean that it is obligatory that only a single injector is present. There may also be two or several injectors.

If the injector is a piezo injector, the actuating time $\tau_{inj}$ is understood to be in particular the time between the start of the charging of the piezo injector and the start of the discharging of the piezo injector. The start of the charging of the piezo injectors is the time from which the energy stored in the piezo actuator increases due to the application of an actuation voltage U. In the same way, the start of the discharging of the piezo injector is the time at which the energy stored in the piezo actuation decreases due to the application of a voltage that is less than the voltage that is present at the piezo actuator at the corresponding time.

For the case that more than one injector is present, it is not necessary for the same actuation voltage $U_i$ to be applied to all injectors. The j-th injector is then actuated with an actuation voltage $U_i^j$. The superscript index j is not an exponent but an index.

An overrun phase of the internal combustion engine is understood to be in particular a state of the internal combustion engine in which only a fuel supply that is less than the idle fuel supply is required to maintain the rotational speed of the internal combustion engine. The idle fuel supply is understood to be the fuel supply that is required to maintain the internal combustion engine in idle mode. The internal combustion engine is thus in the overrun phase in particular if the engine management system is not providing any fuel supply and yet the rotational speed of the internal combustion engine does not drop below the idling speed.

The detection of a torque variation ΔM is understood to be in particular all processes from which a variation in the torque of the internal combustion engine can be concluded. In particular, it is possible to measure an angle of rotation ω of a crankshaft of the internal combustion engine at predetermined time intervals and to determine the rotation angle speed from its relation to time. A variation of the torque can then be concluded from the variation of the rotation angle speed. For this, measured data is recorded beforehand that correlates the variation of the rotation angle speed with a variation of the torque and these measured values are recorded in a table. Interpolation is then used to determine the variation of the torque from this table using the variation of the rotation angle speed.

If the torque variation is determined as described, the relevant injector is only actuated in every w-th (where w=1, 2, 3, 4, 5, 6, 7, 8, 9, or w>9) potential power stroke of a combustion chamber of an internal combustion engine. The other injectors are not actuated during this time. If fuel is injected into the relevant combustion chamber due to the actuation of the injector, this results in an increase of the rotation angle speed and the torque.

However, in the following potential power strokes, i.e. strokes of the internal combustion engine that are actually available as power strokes, the injector is not actuated.

Following the power stroke of the corresponding combustion chamber, during which the injector was actuated, there are therefore w−1 potential power strokes in which the injector could be actuated but is not.

Due to the internal friction of the internal combustion engine, the rotation angle speed decreases due to the lack of injection of fuel. The torque variation due to the actuation of the injector is then concluded from the rotation angle speeds following actuation of the injector and without actuation of the injector.

Step (f) must not be executed in an overrun phase of the internal combustion engine.

In an embodiment, the determined injector characteristic value (K) describes the ageing of the injector. An injector characteristic value that describes the ageing of the injector is a characteristic value of the type that changes due to typical ageing processes in injectors.

An example of this for piezo injectors is the rest length of the piezo actuator when in a de-energized state. A further injector characteristic value is for example the energy sensitivity. The energy sensitivity describes the variation of the injection quantity at a constant actuation time $\tau_{inj}$ in relation to the actuation voltage U of the piezo actuator. The energy stored in a piezo actuator is expressed approximately as $W=\frac{1}{2}CU^2$, where C is the electrical capacity of the piezo actuator and $U^2$ is the square of the applied actuation voltage.

In an embodiment, the injector characteristic value is the value of the idle stroke. Alternatively, the injector characteristic value is the idle stroke voltage. This is the largest voltage that can be applied to the injector during the actuation time $\tau_{inj}$ without the injector opening.

In an embodiment, the method comprises the additional step of executing steps (a) to (f) for an injector for which the method has not yet been executed. The fact that the method has not yet been executed for an injector does not necessarily mean that the method has never been executed for this injector, but rather only that the steps (a) to (f) have not been executed for the injector in question since the start of the method.

The fact that the method has not yet been executed for the injector means in particular that the steps (a) to (f) have not yet been executed during an ongoing overrun phase or in the time interval since the internal combustion engine was last started.

It is of no consequence whether the actuation voltage U is first varied for one injector and then the actuation voltage U is varied for another injector, or whether the actuation voltage U first remains constant and different injectors are actuated in succession and then the actuation voltage is varied.

According to various embodiments, a method may also comprise the initial steps (a) to (c), whereby step (d) is: following the detection of a torque variation $\Delta M_1$ of the torque M, actuation of another injector with the same actuation voltage $U_1$. Step (e) is then: repetition of the steps (a) to (d) for all injectors of the internal combustion engine. A further step (e2) is then: variation of the actuation voltage to a value $U_{i=2}$ that is different from $U_1$ and execution of the steps (a) to (e). A further step (e3) is: repetition of the steps (a) to (e2) with further incrementation of i until i has reached a preset value N or the internal combustion engine is no longer in the overrun phase. This is followed by step (f).

In an embodiment, the method comprises the step of adapting an actuation variable for the individual injector in the engine management system to the determined injector characteristic value $K^j$. $K^j$ is the injector characteristic value of the j-th injector. j is an index and not an exponent.

In an embodiment, the actuation variable for the individual injector is the actuation voltage $U^j$ for the individual injector that is adapted such that all injectors inject essentially the same quantity of fuel m with the same actuation time $\tau_{inj}$. This means that the engine management system actuates each injector with the same actuation time $\tau_{inj}$, but with actuation voltages $U^j$ for the individual injectors, where j is not an exponent, but an index.

The quantities of fuel are then essentially the same if, between the greatest value and the smallest value, there is a difference of maximum 25%, in particular maximum 20%, in particular maximum 15%, in particular maximum 10%, in particular maximum 5%.

In an embodiment, the method may comprise the step of issuing a warning message if the injector characteristic value K exceeds a predetermined threshold value. If the internal combustion engine comprises several injectors, it is sufficient if one of the injector characteristic values $K^j$ exceeds the preset threshold value.

FIG. 1 shows an internal combustion engine in the form of a diesel engine comprising four cylinders 2, namely 2*a*, 2*b*, 2*c*, 2*d*, in which pistons 3, namely 3*a*, 3*b*, 3*c*, 3*d*, operate. The pistons 3 are each connected to a crankshaft 5 by means of a connecting rod 4, namely 4*a*, 4*b*, 4*c*, 4*d*. A rotation angle sensor 6 is affixed to the crankshaft 5 in order to determine a rotation angle ω.

The rotation angle sensor 6 is connected to an engine management system 8 by means of an electrical line 7. The cylinders 2 are supplied with fresh air by means of an air supply line 9. Exhaust leaves the cylinders 2 through an exhaust line 10.

Fuel 13 is routed out of a fuel tank 11, through a fuel line 12 to piezo injectors 14, namely 14*a*, 14*b*, 14*c*, 14*d*. Here, each cylinder 2 has exactly one piezo injector 14. There may also be two or more piezo injectors per cylinder. All piezo injectors 14 are electrically connected to the engine management system 8 by means of a control line 15. The engine management system 8 is electrically connected to a warning lamp that is not shown here by means of a communication line 16.

If the internal combustion engine 1 is in an overrun phase, the digital engine management system 8 controls the piezo injectors in such a way that a quantity of fuel m is injected in the relevant power strokes of the cylinders 2 that is smaller than the quantity of fuel that would be required to keep the internal combustion engine in idle mode. In particular, the engine management system 8 controls the piezo injectors in such a way that no fuel at all is injected. The internal combustion engine 1 is in the overrun phase for example, if the driver of the passenger vehicle removes his foot from the accelerator at a high speed so that the mass of the passenger vehicle pushes the internal combustion engine 1.

In an overrun phase in which no fuel supply is required to maintain the rotational speed of the internal combustion engine 1, the engine management system 8 would not actuate any of the injectors 14 so that no fuel would be injected either.

In order to execute a method according to an embodiment, the engine management system 8 sends an electrical signal to the piezo injector 14*a*. This means that an electrical voltage $U_1$ is applied to the piezo injector 14. Due to the applied voltage $U_1$, a piezo actuator 17 (FIG. 2) lengthens in the piezo injector 14*a* and pushes on a plunger 18. The plunger 18 thus opens a connecting channel 19 between a pressure chamber 20 and a leakage channel 21.

The fuel 13 that is located in the pressure chamber 20 under an injection pressure of 150 MPa flows through the connecting channel 19 into the leakage channel 21 in which a return line pressure of 0.1 to 0.3 MPa prevails. This reduces the pressure in the pressure chamber 20. Due to the fuel pressure in an annular chamber 22, a valve tappet 23 is raised from a valve seat 24 so that fuel can escape from the annular chamber 22 through a nozzle outlet 25.

Due to the actuation by the engine management system 8, the piezo injector 14*a* thus delivers a quantity of fuel $m_1$ into the cylinder 2*a*. In the associated power stroke, the combustion of the quantity of fuel $m_1$ results in an acceleration of the crankshaft 5. By means of the rotation angle sensor 6, a variation in the rotation speed of the crankshaft 5 is detected from the plurality of measurements of the rotation angle $\omega$ and forwarded to the engine management system 8. Based on this signal, the engine management system 8 detects an torque variation $\Delta M_1$.

In the following strokes of the cylinder 2*a*, which may actually be power strokes, no fuel is injected. No fuel is injected into the other cylinders 2*b*, 2*c*, 2*d* either. The rotational speed of the crankshaft 5 therefore subsequently drops, which is detected by the rotation angle sensor 6. In an alternative embodiment, the reduction of the rotation angle speed of the crankshaft 5 is also used to determine the torque variation $\Delta M_1$.

After the engine management system 8 has detected the torque variation $\Delta M_1$, it calculates from it the quantity of fuel $m_1$ that has been injected into the cylinder 2*a* by the piezo actuator 14*a* due to the actuation with the actuation voltage $U_1$.

The engine management system 8 then actuates the piezo injector 14*a* with an actuation voltage $U_2$ that is different from the first actuation voltage $U_1$. The actuation time $\tau_{inj}$ remains constant in this process. Based on the newly applied actuation voltage, the piezo actuator 14*a* again lengthens and a fuel quantity m2 is injected, which is detected by the engine management system 8 based on the torque variation $\Delta M_2$ as described above.

By successive variation of the actuation voltages $U_1$, $U_2$, $U_3$, . . . , i.e. successive increasing or successive lowering of the actuation voltage U for example, the associated quantities of fuel $m_1$, $m_2$, $m_3$, . . . are determined. In this way, a dependence of the quantity of fuel m on the actuation voltage U is obtained.

Figure 3:
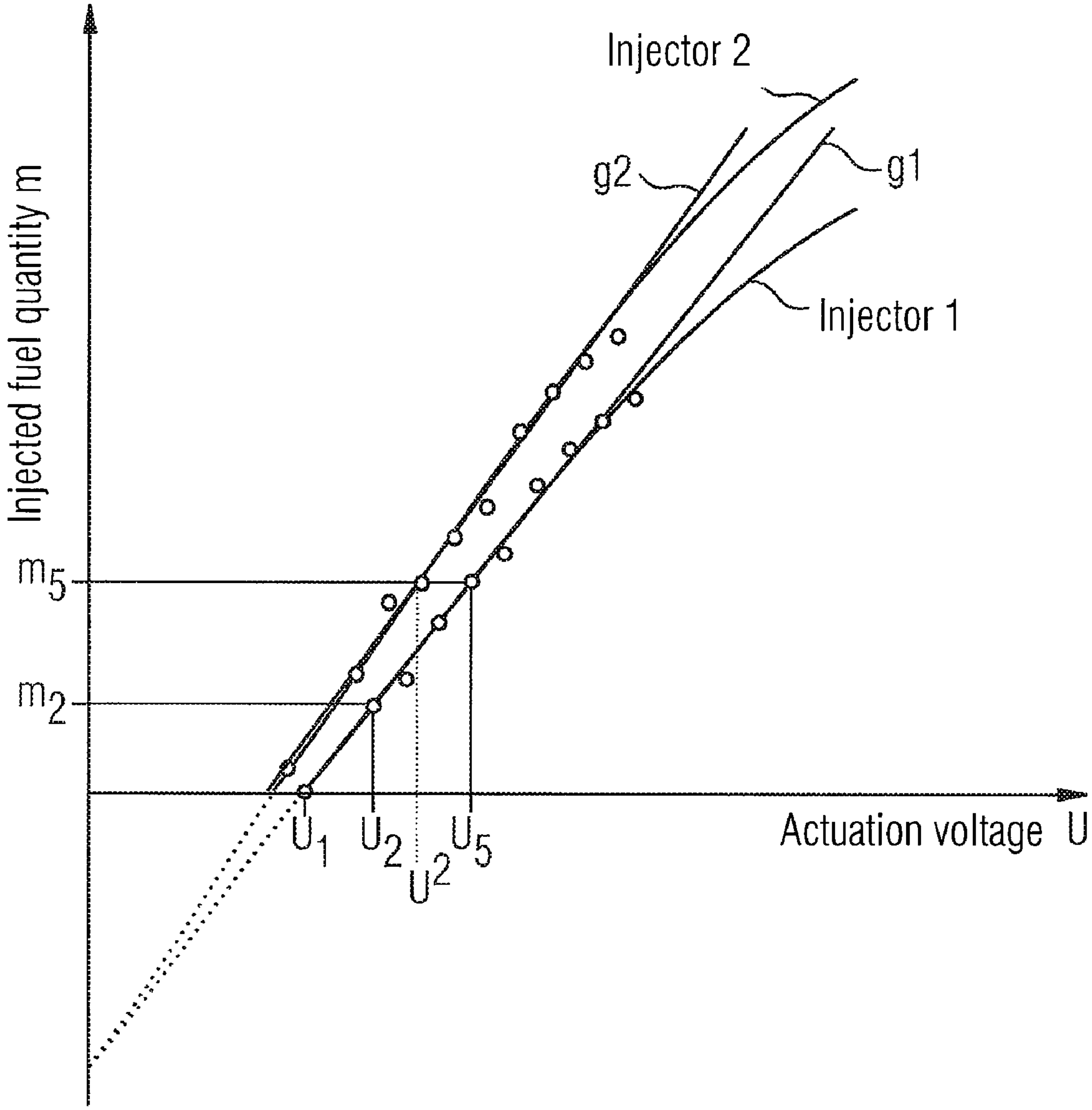
FIG. 3 shows a schematic representation of the interrelationship between the quantity of fuel m and the actuation voltage U.

A graphical representation of this dependence is shown in FIG. 3 for two different piezo injectors 1 and 2, in this case for the piezo injectors 14*a* and 14*b*. The engine management system 8 calculates the line of best fit g1 from the measured values $m_1$, $m_2$, . . . $m_N$ to the actuation voltages $U_1$, $U_2$, . . . , $U_N$. The gradient of the straight line g1 represents a first injector characteristic value $K^1$, where the "1" is not an exponent but an index and indicates that it relates to the first injector (i.e. injector 14*a* in this case).

A second injector characteristic value is the actuation voltage at which the straight line g1 crosses the ordinate. In the instance shown in FIG. 3, this is the case for the actuation voltage $U_1$.

For actuation voltages that are smaller than $U_1$, the elongation of the piezo actuator 17 within actuation time $\tau_{inj}$ is not sufficient to open the piezo injector 1 (in this instance, piezo actuator 14*a*). The reason for this is that the drop in pressure in the pressure chamber 20 described above with reference to FIG. 2 is not sufficient to raise the valve tappet 23 from the valve seat 24.

For an injector 2, in this case injector 14*b* for example, there is a different line of best fit g2. The reason for the differences between injector 1 and injector 2 may be a different ageing behavior for example. This results in an injector characteristic value $K^2$.

If, following the overrun phase, fuel 13 is injected by the injectors 14 after actuation by the engine management system 8 such that the internal combustion engine 1 delivers an output, the engine management system 8 corrects the actuation voltages $U^1$ (for piezo injector 14*a*), $U^2$ (for piezo injector 14*b*), $U^3$ (for piezo injector 14*c*) and $U^4$ (for piezo injector 14*d*) individually for each injector. For example, if a quantity of fuel is to be injected that corresponds to the fuel quantity $m_5$ (cf. FIG. 3), the engine management system 8 actuates the injector 1 (i.e. piezo injector 14*a*) with a voltage $U^1$ that corresponds to $U_5$, whereas it actuates the injector 2 (i.e. piezo injector 14*b*) with a voltage $U^2$ (the "2" is an index) that is less than the actuation voltage $U^1$.

This ensures that, even though they have aged differently, the two injectors 1 and 2 (i.e. the piezo injectors 14*a* and 14*b*) inject the same quantity of fuel $m_5$ with the same actuation time $\tau_{inj}$.

Accordingly, the actuation voltages for all other piezo injectors are also corrected for each individual injector so that all the piezo injectors inject the same quantity of fuel $m_5$ with the same actuation time $\tau_{inj}$ regardless of whether they have aged differently.

Figure 4:
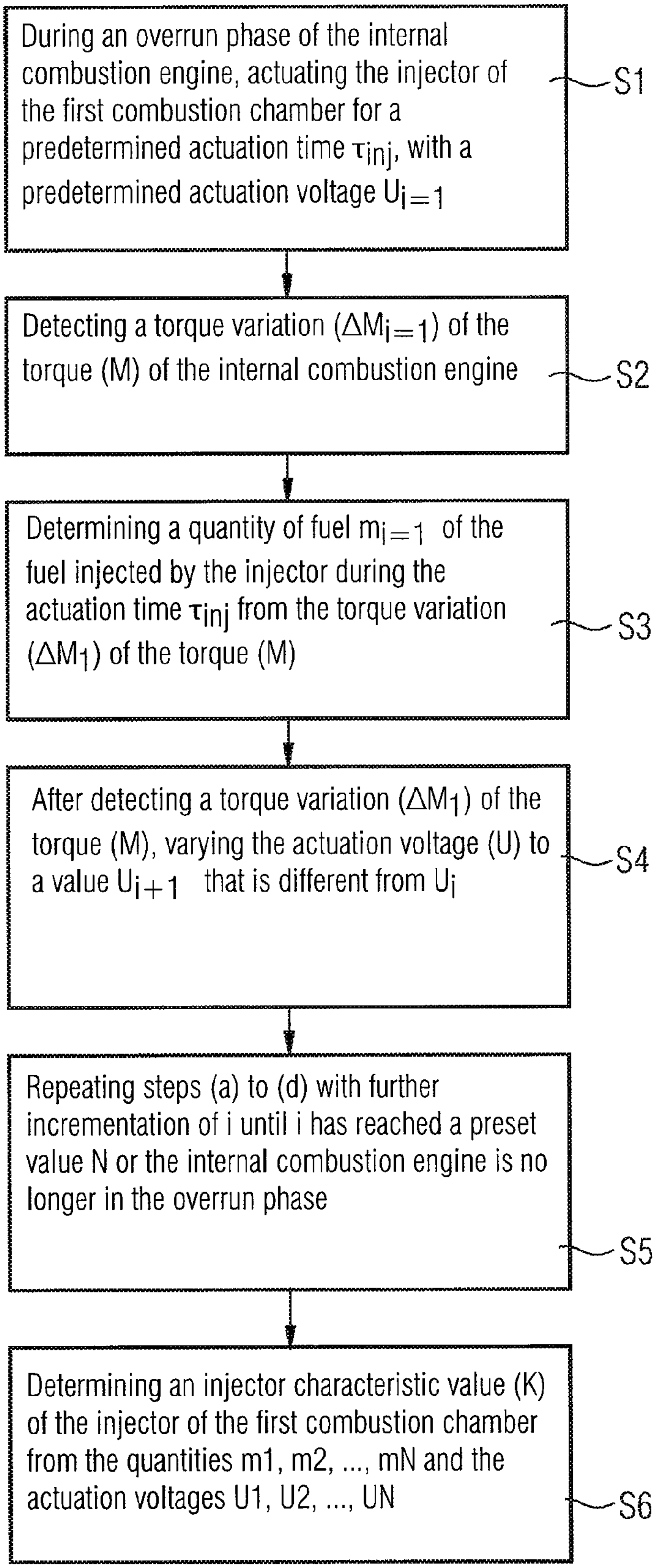
FIG. 4 shows a flow diagram of a method according to an embodiment.

FIG. 4 shows a flow diagram of the method according to an embodiment. In a first step S1, the injector 14*a* of the first combustion chamber 2*a* is actuated for a predetermined actuation time $\tau_{inj}$ with a predetermined actuation voltage $U_{i=1}$ during an overrun phase of the internal combustion engine 1. In a second step S2, the torque variation $\Delta M_{i=1}$ of the torque M of the internal combustion engine 1 is determined, for example by measuring the temporal variation of the rotation angle speed of the crankshaft 5.

In a third step S3, the quantity of fuel $m_{i=1}$ that has been injected during the actuation time $\tau_{inj}$ by the injector 14*a* is determined from the torque variation $\Delta M_{i=1}$ of the torque M. In a subsequent fourth step S4, the actuation voltage U is varied to a value $U_{i+1}$ that is different from $U_i$.

The steps one to four are repeated with further incrementation of i until i has reached a preset value N or the internal combustion engine 1 is no longer in the overrun phase (step S5). An injector characteristic value K of the injector 14*a* is then calculated from the quantities of fuel $m_1$, $m_2$, . . . , $m_N$ determined in the aforementioned steps and the associated actuation voltages $U_1$, $U_2$, . . . , $U_N$ (step S6). The method is then repeated for the other injectors of the internal combustion engine.

The invention is not restricted to the exemplary embodiment described above. In fact, a multitude of variants and modifications are possible that also make use of the inventive concept and therefore fall within the scope of protection.

The invention claimed is:

1. A method for operating an internal combustion engine with at least a first combustion chamber and an injector for each combustion chamber for injecting fuel into the at least one combustion chamber, and that exhibits a torque during operation, the method comprising the steps:

(a) during an overrun phase of the internal combustion engine, actuating the injector of the first combustion chamber for a predetermined actuation time with a predetermined actuation voltage, (b) detecting a torque variation of the torque of the internal combustion engine, (c) determining from the torque variation of the torque a quantity of fuel of the fuel injected by the injector during the actuation time, (d) after detecting a torque variation of the torque, varying the actuation voltage, (e) repeating the steps (a) to (d) until either the actuation voltage has been varied a preset number of times N or the internal combustion engine is no longer in the overrun phase, and (f) determining an injector characteristic value of the injector of the first combustion chamber from the quantities of fuel and the actuation voltages.

2. The method according to claim 1, wherein the injector characteristic value describes the ageing of the injector.

3. The method according to claim 1, wherein the injector characteristic value is the energy sensitivity of the injector.

4. The method according to claim 1, wherein the injector exhibits an idle stroke and the injector characteristic value is the value of the idle stroke.

5. The method according to claim 1, comprising the additional step:

once the preset value N has been reached, execution of the steps (a) to (f) for an injector for which the method has not yet been executed.

6. The method according to claim 5, wherein the internal combustion engine has at least two combustion chambers each with at least one injector and the method is executed for all injectors so that injector characteristic values are obtained for all injectors.

7. The method according to claim 6, wherein the internal combustion engine has an engine management system for actuating the injectors and the method comprises the step of adjusting an actuation variable for the individual injectors in the engine management system to the determined injector characteristic values.

8. The method according to claim 7, wherein the actuation variable for the individual injector is the actuation voltage for the individual injector, which is adapted in such a way that all the injectors inject essentially the same quantities of fuel with the same actuation time.

9. The method according to claim 8, wherein the engine management system has a shortest possible actuation time and the method is executed if this shortest possible actuation time is not sufficient for injecting a predetermined injection quantity.

10. The method according to claim 1, comprising the step:

issuing of a warning message if the injector characteristic value exceeds a preset threshold value.

11. An internal combustion engine comprising at least one combustion chamber and an injector for each combustion chamber for injecting fuel into the at least one combustion chamber, and an engine management system operable (a) during an overrun phase of the internal combustion engine, to actuate the injector of the first combustion chamber for a predetermined actuation time with a predetermined actuation voltage, then (b) to detect a torque variation of the torque of the internal combustion engine, (c) to determine from the torque variation of the torque a quantity of fuel of the fuel injected by the injector during the actuation time, (d) after detecting a torque variation of the torque, to vary the actuation voltage, (e) to repeat steps (a) to (d) until either the actuation voltage has been varied a preset number of times N or the internal combustion engine is no longer in the overrun phase, and (f) to determine an injector characteristic value of the injector of the first combustion chamber from the quantities of fuel and the actuation voltages.

12. The internal combustion engine according to claim 11, wherein the injector characteristic value describes the ageing of the injector.

13. The internal combustion engine according to claim 11, wherein the injector characteristic value is the energy sensitivity of the injector.

14. The internal combustion engine according to claim 11, wherein the injector exhibits an idle stroke and the injector characteristic value is the value of the idle stroke.

15. The internal combustion engine according to claim 11, wherein the engine management system is further operable:

once the preset value N has been reached, to execute (a) to (f) for an injector for which (a) to (f) have not yet been executed.

16. The internal combustion engine according to claim 15, wherein the internal combustion engine has at least two combustion chambers each with at least one injector and (a) to (f) are executed for all injectors so that injector characteristic values are obtained for all injectors.

17. The internal combustion engine according to claim 16, wherein the internal combustion engine has an engine management system for actuating the injectors and the engine management system is further operable to adjust an actuation variable for the individual injectors in the engine management system to the determined injector characteristic values.

18. The internal combustion engine according to claim 17, wherein the actuation variable for the individual injector is the actuation voltage for the individual injector, which is adapted in such a way that all the injectors inject essentially the same quantities of fuel with the same actuation time.

19. The internal combustion engine according to claim 18, wherein the engine management system has a shortest possible actuation time and (a) to (f) are executed if this shortest possible actuation time is not sufficient to inject a predetermined injection quantity.

20. The internal combustion engine according to claim 11, wherein the engine management system is further operable to issue a warning message if the injector characteristic value exceeds a preset threshold value.

* * * * *